(12) United States Patent
Park et al.

(10) Patent No.: US 9,605,191 B2
(45) Date of Patent: Mar. 28, 2017

(54) COMPOSITE OF ADHESIVE FILMS AND SHOE SOLE USING SAME

(71) Applicants: Hee-Dae Park, Busan (KR); Veerag Mehta, South Plainfield, NJ (US)

(72) Inventors: Hee-Dae Park, Busan (KR); Veerag Mehta, South Plainfield, NJ (US)

( * ) Notice: Subject to any disclaimer, the term of this patent is extended or adjusted under 35 U.S.C. 154(b) by 38 days.

(21) Appl. No.: 14/539,103

(22) Filed: Nov. 12, 2014

(65) Prior Publication Data

US 2015/0068060 A1 Mar. 12, 2015

Related U.S. Application Data

(62) Division of application No. 13/622,459, filed on Sep. 19, 2012, now Pat. No. 8,969,453, which is a division of application No. 13/353,401, filed on Jan. 19, 2012, now Pat. No. 8,568,548.

(30) Foreign Application Priority Data

Dec. 27, 2011 (KR) .................. 10-2011-0143127

(51) Int. Cl.
| | |
|---|---|
| C09J 175/06 | (2006.01) |
| A43B 13/04 | (2006.01) |
| A43B 13/18 | (2006.01) |
| C09J 5/06 | (2006.01) |
| B29D 35/14 | (2010.01) |
| A43D 25/00 | (2006.01) |

(52) U.S. Cl.
CPC ............ *C09J 175/06* (2013.01); *A43B 13/04* (2013.01); *A43B 13/187* (2013.01); *A43D 25/00* (2013.01); *B29D 35/142* (2013.01); *C09J 5/06* (2013.01); *C09J 2421/006* (2013.01)

(58) Field of Classification Search
CPC . C09J 7/0285; C09J 175/06; C09J 5/06; C09J 2421/006; A43B 13/187; A43B 13/04; A43D 25/00; B29D 35/142

USPC ............ 156/331.7; 36/12, 28; 524/277, 387
See application file for complete search history.

(56) References Cited

U.S. PATENT DOCUMENTS

| | | | | |
|---|---|---|---|---|
| 5,320,889 A | * | 6/1994 | Bettle, III | ............ B65D 1/0215 215/12.2 |
| 2003/0124347 A1 | * | 7/2003 | Sasongko | ................ A43B 1/00 428/355 EN |

FOREIGN PATENT DOCUMENTS

| | | | | |
|---|---|---|---|---|
| JP | 2000178229 A | * | 6/2000 | |
| WO | WO 9906209 A1 | * | 2/1999 | ............ B32B 21/08 |
| WO | WO 0015728 A1 | * | 3/2000 | ............ B32B 27/32 |

OTHER PUBLICATIONS

JP 2000-178229 A (2000), machine translation, JPO Japan Platform for Patent Information (J-PlatPat).*
Irogran Thermoplastic Polyurethanes, Huntsman, datasheet (2012), [retrieved Jun. 9, 2016], retreived from the Internet <URL: http://www.huntsman.com/polyurethanes/Media%020Library/a__; MC1CD1F5AB7BB1738E040EBCD2B6B01F1 /Products__MC1CD1F5AB8081738E040EBCD2B6B01F1/Thermoplastic%20polyur_MDC92D212C2A5565FE040EBCD2B6B3E40/files/Film_Sheet_US_internet.pdf >.*

* cited by examiner

Primary Examiner — Susannah Chung
Assistant Examiner — Josephine Chang
(74) Attorney, Agent, or Firm — Park & Associates IP Law, P.C.

(57) ABSTRACT

Disclosed therein are adhesive films and a composite of the adhesive film, which can allow an outsole and a midsole to be simultaneously molded in manufacturing footwear. The adhesive film composite is formed of a polyester-type thermoplastic polyurethane (TPU) material, a polyethylene-based coupling agent, montan wax and fatty acid esters with pentaerythritol.

8 Claims, 6 Drawing Sheets

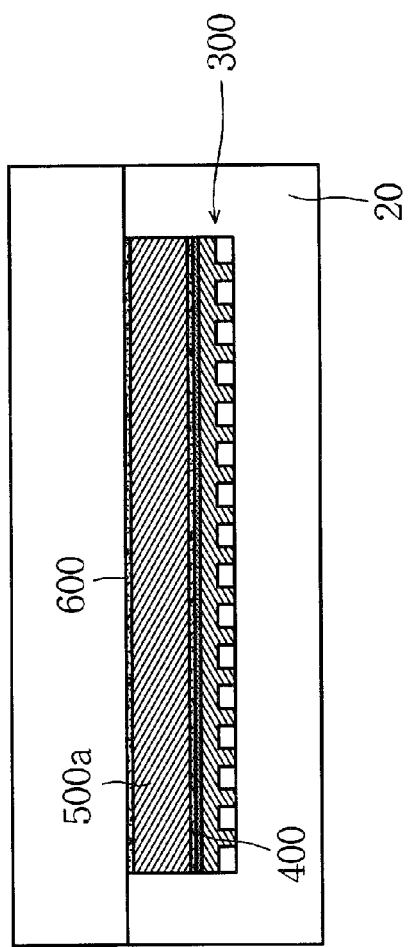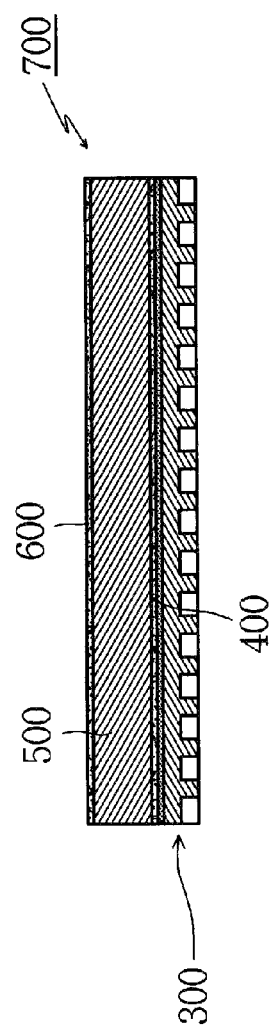

COMPOSITE OF ADHESIVE FILMS AND SHOE SOLE USING SAME

REFERENCE TO RELATED APPLICATIONS

This is a divisional application of U.S. application Ser. No. 13/622,459, filed on Sep. 19, 2012, which is a divisional application of U.S. application Ser. No. 13/353,401, filed on Jan. 19, 2012, now issued as U.S. Pat. No. 8,568,548, and claiming the priority benefit of Korean Patent Application No. 10-2011-0143127, filed on Dec. 27, 2011, the entire contents of which are incorporated herein by reference.

FIELD OF THE INVENTION

The present invention relates to a method of manufacturing footwear using adhesive films, and more particularly, to a method of manufacturing footwear using adhesive films, which does not need additional bonding and cleaning facilities as well as processes of cleaning, UV priming (or UV radiation), aqueous priming, and bonding when footwear including an outsole, a midsole and an upper is manufactured, which is eco-friendly, and which can reduce the number of workers, and to a composite of the adhesive film.

BACKGROUND OF THE INVENTION

As well known, footwear is used to protect a wearer's feet and is manufactured and sold in various forms and kinds. In generally, the footwear includes: an upper for covering and protecting the top of the foot and the ankle; and a sole for protecting the sole of the wearer's foot and increasing a frictional force between the footwear and the ground to thereby improve the wearer's walking performance and relieve the shock applied to the sole of the wearer's foot while walking.

Moreover, the sole includes: an insole that is the interior bottom of the footwear; a midsole that is made of rubber, foamed resin or sponge with an excellent buffer power to resiliently disperse and support the wearer's weight; and an outsole that is attached to the bottom surface of the midsole and is made of rubber material to provide a frictional force while the wearer walks. As described above, the upper, the midsole and the outsole are separately manufactured and joined together through the processes of cleaning, priming and bonding.

In the meantime, Korean Patent No. 10-0978284 discloses a method of manufacturing footwear including an outsole, a midsole and an upper in detail. Referring to FIG. 8, the method of manufacturing footwear disclosed in Korean Patent No. 10-0978284 will be described in detail.

As shown in FIG. 8, first, a method of manufacturing the midsole includes the steps of: forming the outsole by putting a rubber sheet in a mold and pressing it at high temperature and high pressure; buffing to make the surface of the outsole rough in order to increase an contact area between the outsole and the midsole; cleaning the molded outsole with aqueous alkali cleaner (pH 10 to 12) (or hydro-cleanser, in which is mixed with water) for five to ten minutes using a cleaning machine; coating aqueous or oil primer containing acetone so that adhesive is smoothly applied onto the surface of the outsole; drying the coated outsole; applying the adhesive; and drying.

Next, a method of manufacturing the midsole includes the steps of: putting a raw material (generally, EVA) in a press phylon mold or a CMP (Compressed Molded Phylon) mold to mold a pre-foamed midsole; putting the pre-foamed midsole into another phylon mold to complete the shape of the phylon midsole, wherein the midsole molding process generally includes three or two steps of foaming EVA of a biscuit form in such a way as to be about 190 percent larger than the actual size of the midsole, forcedly putting the foamed EVA into a phylon mold, and forcedly press-molding it to become a midsole of the actual size; cleaning the midsole with water of 40° C. to 60° C. for 5 minutes to 10 minutes using a cleaning machine; coating with UV primer and radiating UV rays to modify the coated surface of the midsole so that the midsole and the upper can be bonded firmly; coating the surface of the midsole with aqueous primer and adhesive; and drying the midsole.

Next, a method of manufacturing the upper includes the steps of: cutting woven fabric or leather to form the upper; cleaning the upper with methyl ethyl ketone (MEK) so that the upper and the midsole can be bonded firmly; coating the upper with aqueous primer; drying the coated upper; applying adhesive to the upper; and drying the upper.

After the outsole, the midsole and the upper are manufactured through the above processes, when fixed heat and pressure are applied in a state where the outsole and the midsole are put in a mold in order, the midsole and the outsole are bonded together, so that the sole having the midsole and the outsole is manufactured.

After bonding of the midsole and the outsole is completed, when fixed heat and pressure are applied in a state where the sole and the upper are put in a mold in order, the sole and the upper are joined together, so that the footwear is completely finished.

However, the conventional method of manufacturing footwear including the above processes has several problems as follows.

First, as described above, there are many environmental obstacles, consumption of many raw materials, and a great deal of processes in manufacturing the outsole, the midsole and the upper, and it causes deterioration of productivity and increase of manufacturing costs.

For instance, in the case of the buffing process of making the surface of the outsole rough in order to increase a contact area between the midsole and the outsole, it aggravates working environment because dust of rubber, which is a material of the outsole and is harmful to the human body, is generated. Furthermore, in order to remove foreign matters stained on the outsole, a worker has to use aqueous alkali cleaner (or water and hydro cleanser) using a separate cleaning machine, and hence, it has several problems in that additional costs are incurred due to purchase of machines, footwear manufacturing processes are increased, and it requires a lot of manpower.

Second, the above problems are incurred also when the midsole is manufactured.

Third, when the outsole, the midsole and the upper are manufactured, all of the manufacturing methods require the process of coating UV primer or radiating UV rays and coating primer containing acetone and the process of applying adhesive in order to achieve a firm bonding, however, the processes increase the manufacturing costs due to a lot of manpower and increase of footwear manufacturing processes (namely, the primer coating and adhesive applying processes).

Fourth, solvents used for the UV primer coating, UV radiating, and acetone-containing primer coating processes may damage the worker's eyes, irritate the skin, cause respiratory irritation and nausea, sickness, and sleepiness and affect lungs when the worker inhale the solvents, and cause paralysis and convulsion as long-term symptoms, and hence, the solvents may give the worker a fatal damage.

Fifth, according to the conventional footwear manufacturing method, the outsole, the midsole and the upper are separately molded and are bonded together through a great deal of processes, such as cleaning, primer coating, adhesive applying, drying steps, and hence, it causes deterioration of productivity and increase of manufacturing costs due to a lot of raw materials and manpower.

SUMMARY OF THE INVENTION

Accordingly, the present invention has been made to solve the above-mentioned problems occurring in the prior arts, and it is an object of the present invention to provide a method of manufacturing footwear using adhesive films and a composite of the adhesive film, which can simultaneously manufacture a midsole and an outsole in a phylon mold for a midsole without carrying out a cleaning step, a primer coating step, and a bonding step when footwear including the outsole, the midsole and a upper is manufactured.

It is another object of the present invention to provide a method of manufacturing footwear using adhesive films and a composite of the adhesive film, which there is no need to use additional bonding machine and cleaning machine when the footwear is manufactured, which is eco-friendly, and which can reduce manpower and remarkably reduce the number of footwear manufacturing processes.

It is a further object of the present invention to provide a method of manufacturing footwear using adhesive films and a composite of the adhesive film, which can simultaneously mold the outsole and the midsole using the adhesive film.

It is a still further object of the present invention to provide a method of manufacturing footwear using adhesive films and a composite of the adhesive film, which can simultaneously mold the midsole and the outsole and simply bond the upper and the sole with each other.

To accomplish the above objects, according to the present invention, there is provided a method of manufacturing footwear using adhesive films including the steps of: inserting a rubber sheet 100 into a mold (10) generally used for molding outsoles, putting a first adhesive film (200) on the rubber sheet, and pressurizing them to mold an outsole (300); inserting the molded outsole (300) into a phylon mold (20) used for molding midsoles, putting an adhesive film (400) on the outsole (300), putting an EVA foam (500a) on the first adhesive film (400), putting a second adhesive film 600 or the first adhesive film 400, and pressurizing them to form and manufacture a shoe sole (700); and bonding the shoe sole (700) and an upper with each other using the second adhesive film (600) or the first adhesive film (400) bonded on the surface of the midsole.

More preferably, the first adhesive films are adhesive films for bonding the outsole and the midsole with each other, and a composite of the first adhesive films consists of: syndiotactic 1,2-polybutadiene; polyethylene-based coupling agent containing 7 percent of maleic anhydride; montane wax; and fatty acid esters with pentaerythritol having five to nine carbons.

Furthermore, the second adhesive film is an adhesive film for bonding an upper and a shoe sole having the outsole and the midsole with each other, and a composite of the second adhesive film consists of: polyester-type thermoplastic polyurethane; ethylene vinyl acetate (EVA)-based compatibilizer containing maleic anhydride; montan wax; and fatty acid esters with pentaerythritol having five to nine carbons.

As described above, the present invention can remarkably reduce the footwear manufacturing process and prevent waste of manpower necessary for carrying cleaning and bonding (primer coating) processes because the midsole made of EVA foam and the outsole made of rubber are simultaneously molded in the phylon mold.

Moreover, the present invention can enhance productivity of products, reduce manufacturing costs, and minimize the number of manpower because the present invention does not need additional processes of cleaning the midsole and the outsole, coating primer, and applying adhesives when footwear including the outsole, the midsole and the upper is manufactured.

Furthermore, the present invention is eco-friendly and can realize clean working environment and protect workers from harmful ingredients or materials because there is no need to carry out the primer coating process and the bonding process.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 4 is a view showing how to simultaneously mold the outsole and a midsole shown in FIG. 1;

FIG. 5 is a view showing a shoe sole on which the outsole and the midsole are simultaneously molded by the method of FIG. 4;

DETAILED DESCRIPTION OF THE INVENTION

Figure 1:
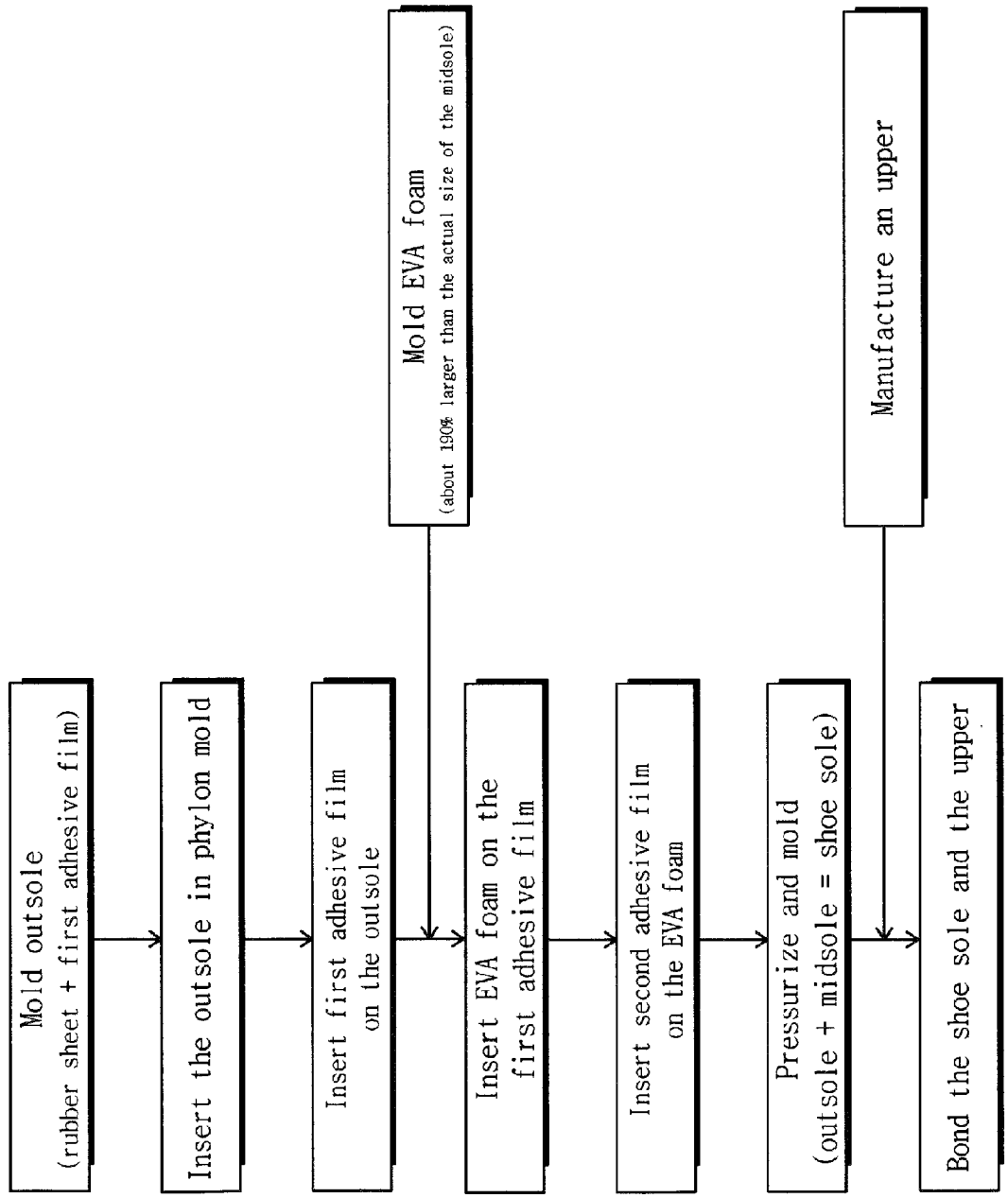
FIG. 1 is a view showing a method of manufacturing footwear using adhesive films according to a preferred embodiment of the present invention.

Reference will be now made in detail to the preferred embodiment of the present invention with reference to the attached drawings. The representative embodiment will be written in the following detailed description to achieve the above-stated objects. Moreover, the description will be substituted for other embodiments, which may be proposed in the present invention.

The present invention is to realize a method of manufacturing footwear using adhesive films and a composite of the adhesive film, which can allow an outsole and a midsole to be simultaneously molded and formed through the steps of putting the midsole made of EVA foam and the outsole made of rubber into a mold, inserting an adhesive film between the midsole and the outsole, and applying high temperature and high pressure to the midsole and the outsole, thereby not needing to carry out a cleaning process, a primer coating process, and a bonding process when an outsole and a midsole are manufactured, not needing additional facilities for the cleaning and bonding processes, reducing unnecessary manpower, and improving working environments.

For this, a method of simultaneously forming the midsole and the outsole should be disclosed in detail, and composite of the adhesive film used when the midsole and the outsole are simultaneously formed should be described in detail.

Hereinafter, referring to the drawings, the preferred embodiment of the present invention will be described in detail.

FIGS. 1 to 5 are detailed views showing the method of simultaneously forming and manufacturing footwear, which includes an outsole, a midsole, and an upper, using adhesive films according to a preferred embodiment of the present invention.

A method of molding a shoe sole 700 having an outsole 300 and a midsole 500 simultaneously molded includes the steps of: inserting a first adhesive film 200 and a rubber sheet 100 into a mold 10, which is generally used for molding outsoles, applying high temperature and high pressure to the mold to mold an outsole 300, inserting the molded outsole 300 with the first adhesive film 200 into a phylon mold 20, which is generally used for molding midsoles; putting a first adhesive film 400, an EVA foam 500a, and a second adhesive film 600 in order; and molding them at high temperature and high pressure. That is, the outsole 300 and the midsole 500 are bonded by the first adhesive films 200 and 400 inside the phylon mold 20, and the shoe sole 700 formed by bonding of the outsole 300 and the midsole 500 and the upper are bonded by the second adhesive film 600. In this instance, when the shoe sole 700 and the upper are bonded together, the first adhesive films 200 and 400 in lieu of the second adhesive film 600 may be used.

Figure 2:
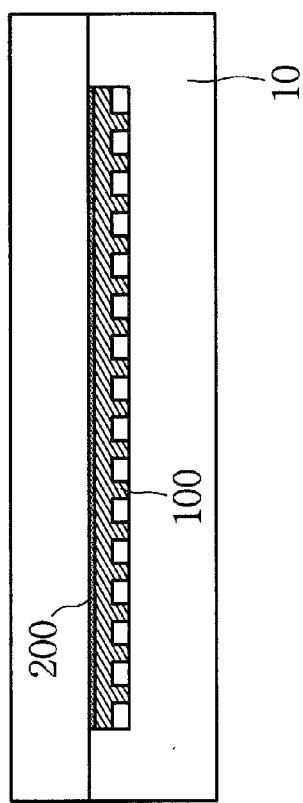
FIG. 2 is a view showing a method of molding an outsole shown in FIG. 1.
Figure 3:
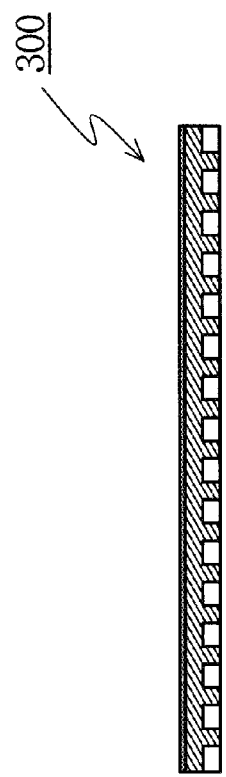
FIG. 3 is a view showing the outsole molded by the method of FIG. 2.

Referring to FIGS. 1 and 2, the outsole 300 shown in FIG. 3 is molded through the steps of inserting unvulcanized rubber into the mold 10 for outsoles, putting the first adhesive film 200 on the unvulcanized rubber, and vulcanizing them at high temperature and high pressure (preferably, at temperature of 150° C. to 160° C. and at pressure ranging from 100 kgf/cm² to 160 kgf/cm²) for five to ten minutes. When the outsole 300 is molded as described above, if the first adhesive film 200 is used, there is no need to carry out the processes required to bond the outsole and the midsole, in detail, buffing, cleaning, primer coating, and bonding processes. The composite and properties of the first adhesive film 200 will be described later in detail.

Next, as shown in FIG. 4, the outsole 300 on which the first adhesive film 200 is molded integrally is inserted into the phylon mold 20, the first adhesive film 400 is put on the outsole 300, the EVA foam 500a is put on the first adhesive film 400, and then, the second adhesive film 600 is put on the EVA foam 500a. In this instance, the EVA foam 500a means the EVA foam foamed by a general method, for instance, an EVA of a biscuit form is foamed and molded about 190 percent larger than the actual size of the midsole. Moreover, the phylon mold 20 is a generally used mold, namely, means a mold generally used when midsoles are manufactured. It is preferable that the phylon mold 20 used in the present invention is deeper than the conventional phylon mold. The reason is to insert all of the outsole 300, the first adhesive film 400, the EVA foam 500a, and the second adhesive film 600 into the phylon mold 20 at once.

After that, as shown in FIG. 4, when the outsole 300, the first adhesive film 400, the EVA foam 500a, and the second adhesive film 600 inserted into the phylon mold 20 are pressurized at temperature of 160° C. and at pressure of 60 kgf/cm², the shoe sole 700 that the outsole 300 and the midsole 500 are molded simultaneously as shown in FIG. 5 is manufactured.

Finally, when the shoe sole (preferably, shoe sole that the outsole and the midsole are simultaneously molded in the phylon mold) manufactured through the above molding method and the upper (not shown) manufactured through a general method are bonded together, the footwear according to the present invention is manufactured. In this instance, the shoe sole 700, in detail, the midsole 500, and the upper are bonded by the second adhesive film 600.

In the meantime, as described above, the adhesive films are used in order to simultaneously pressurize and mold the outsole 300 and the midsole 500 inserted into the phylon mold, and in detail, the first adhesive films 200 and 400 are used to bond the outsole 300 and the EVA-foamed midsole 500, and the second adhesive film 600 is used to bond the midsole 500 and the upper. Hereinafter, composites and properties of the first and second adhesive films 200, 400 and 600 will be described in detail.

First, as shown in FIG. 4, the first adhesive films 200 and 400, used when the outsole 300 and the midsole 500 are simultaneously bonded and molded in the phylon mold 20, contain rubber-based thermo plastic elastomer (hereinafter, called "TPE") or olefin series material or rubber series material as the main ingredient for rubber bonding, preferably, 50 to 98 percent by weight of syndiotactic 1,2-polybutadiene. In this instance, if syndiotactic 1,2-polybutadiene which is less than 50 percent by weight is used, linearity and intensity of the films are decreased, and if syndiotactic 1,2-polybutadiene which is more than 98 percent by weight is used, the adhesive force is deteriorated.

Furthermore, the first adhesive films 200 and 400 contain polyethylene-based coupling agent or ethylene vinyl acetate (hereinafter, called "EVA")-based coupling agent as the main ingredient for EVA foam bonding, preferably, 2 to 50 percent by weight of polyethylene-based coupling agent, which contains 2 to 20 percent of maleic anhydride. In this instance, if the polyethylene-based coupling agent which is less than 2 percent by weight is used, the adhesive force is deteriorated, and if the polyethylene-based coupling agent which is more than 50 percent by weight is used, linearity and intensity of the films are decreased.

Moreover, in the present invention, processing materials for 100 parts by weight of the main ingredients are additionally used. In detail, 0.2 parts by weight of montan wax and 2 parts by weight of fatty acid (C=5-9) esters with pentaerythritol having five to nine carbons are used. In this instance, the processing materials are used to make the first adhesive films 200 and 300 smoothly get out of a T-die without being attached to a dies lip when they are extruded in the T-die.

The following Table 1 shows a detailed composition ratio of the first adhesive films 200 and 400.

TABLE 1

| Composite of 1$^{st}$ adhesive film | Composition Ratio | Remark |
| --- | --- | --- |
| Syndiotactic 1,2-polybutadiene | 95% by weight | |
| Polyethylene-based coupling agent (containing 7 percent of maleic anhydride) | 5% by weight | |
| Montan wax | 0.2 pbw | part by weight |
| Esters with Pentaerythritol | 2 pbw | part by weight |

The following Table 2 shows test data values obtained through comparison and analysis of properties of the first adhesive films 200 and 400 and properties of the ingredient materials.

TABLE 2

| Test Method | Specification | Syndiotactic 1,2-polybutadiene | Polyethylene-based coupling agent | First adhesive Film of the Present invention |
|---|---|---|---|---|
| Type | FT-IR | TPE (Rubber Base) | PE Base Containing MA | |
| Melt Temperature | DSC | 96.11° C. | 111.7° C. | 116.35° C. |
| Flow Beginning Temperature | Capillary Rheo-meter | 105.9° C. | 108.9° C. | 106.6° C. |
| Specific Gravity | | | | 0.943 g/cc |
| 100% Modulus | UTM | | | 78 kgf/cm$^2$ |
| Tensile strength | UTM | | | 175 kgf/cm$^2$ |
| Tear Strength | UTM | | | 78 kgf/cm |
| Elongation | UTM | | | 500% |

Figure 6:
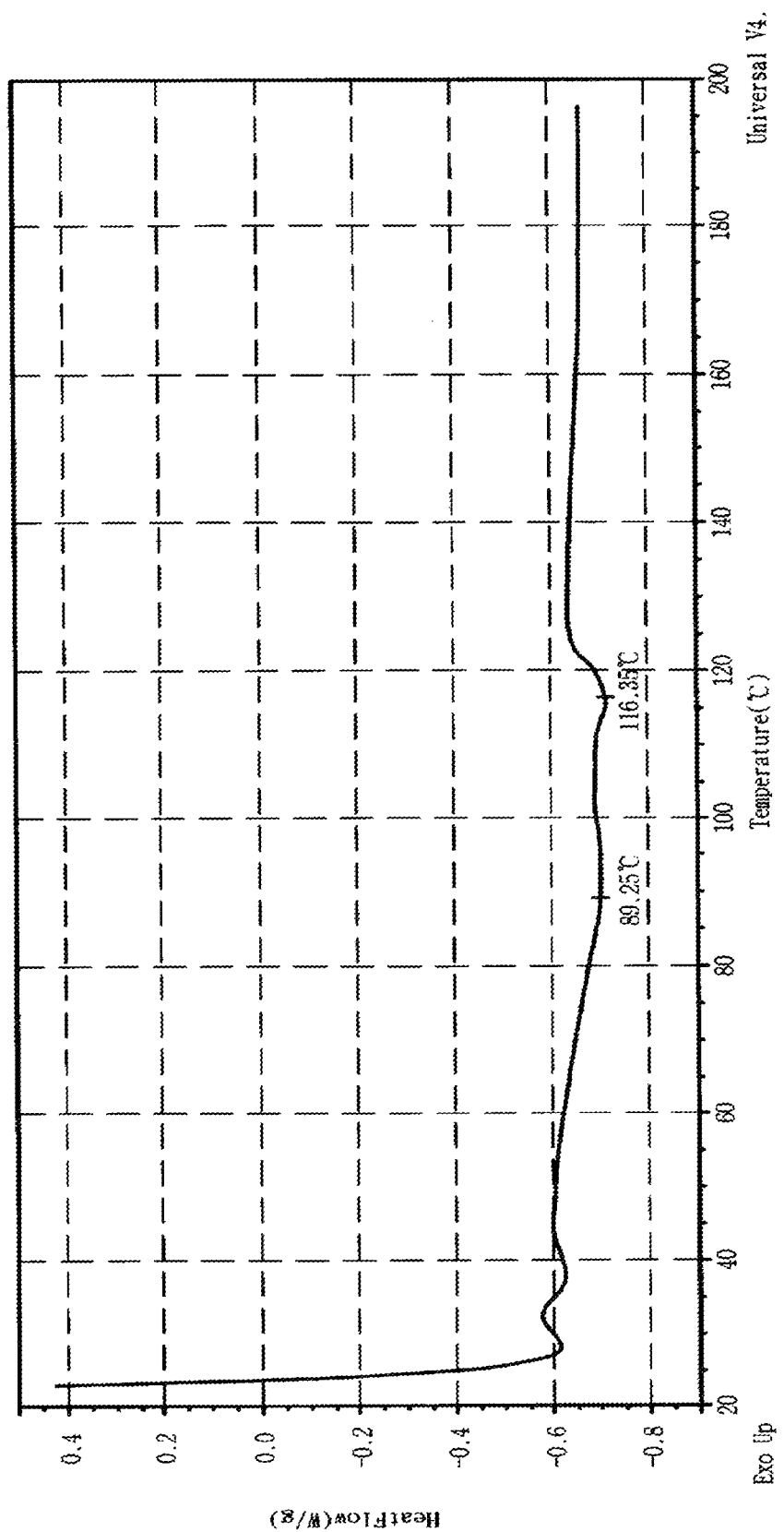
FIG. 6 is a graph showing a differential thermal analysis of first adhesive films shown in FIG. 1.

In addition, FIG. 6 shows a differential thermal analysis of the first adhesive films 200 and 400 having the properties shown in Table 2. The graph of FIG. 6 shows melt temperatures and heat flows of the first adhesive films 200 and 400, and for this, a DSC (Differential Scanning calorimetry) is used.

Meanwhile, as shown in FIG. 4, when the outsole 300 and the midsole 500 are simultaneously molded in the phylon mold 20, the second adhesive film 600 put on the EVA foam 500*a* contains 50 to 98 percent by weight of polyester-type TPU as the main ingredient for bonding with the upper (for instance, made of textile, synthetic leather, or natural leather) and 2 to 50 percent by weight of EVA-based compatibilizer (containing 2 to 20 percent of maleic anhydride, preferably, 6 percent of maleic anhydride) as the main ingredient for EVA foam bonding. In this instance, if polyester-type TPU which is less than 50 percent by weight is used, the bond strength is deteriorated, and if polyester-type TPU which is more than 98 percent by weight is used, compatibility with an adherend and wetting mechanism are decreased, and hence, the adhesive film 600 is not adhered. Moreover, if EVA-based compatibilizer which is less than 2 percent by weight is used, compatibility with the adherend and wetting mechanism are decreased, and hence, the adhesive film 600 is not adhered. If EVA-based compatibilizer which is more than 50 percent by weight is used, bond strength is deteriorated.

In addition, in the present invention, processing materials for 100 parts by weight of the main ingredients are additionally used. In detail, 0.2 parts by weight of montan wax and 2 parts by weight of fatty acid (C=5-9) esters with pentaerythritol having five to nine carbons are used. In this instance, the processing materials are used to make the second adhesive film 600 smoothly get out of a T-die without being attached to a dies lip when they are extruded in the T-die.

The following Table 3 shows a detailed composition ratio of the second adhesive film 600.

TABLE 3

| Composite of 2$^{nd}$ adhesive film | Composition Ratio | Remark |
|---|---|---|
| Polyester type TPU | 77.5% by weight | |
| EVA-based compatibilizer (containing 6 percent of maleic anhydride) | 22.5% by weight | |
| Montan wax | 0.2 pbw | part by weight |
| Esters with Pentaerythritol | 2 pbw | part by weight |

Additionally, the following Table 4 shows the properties of the second adhesive film 600 in detail.

TABLE 4

| Test Method | Specification | Second adhesive film |
|---|---|---|
| Melt Temperature | DSC | 102.35° C. |
| | | 158.15° C. |
| Flow Beginning Temperature | Capillary Rheo-meter | 155.2° C. |
| Specific Gravity | | 1.141 g/cc |
| Thickness | Thickness Gauge | 0.11 mm |
| 300% Modulus | UTM | 130 kgf/cm$^2$ |
| Tensile strength | UTM | 610 kgf/cm$^2$ |
| Tear Strength | UTM | 107 kgf/cm |
| | UTM | 560% |

Figure 7:
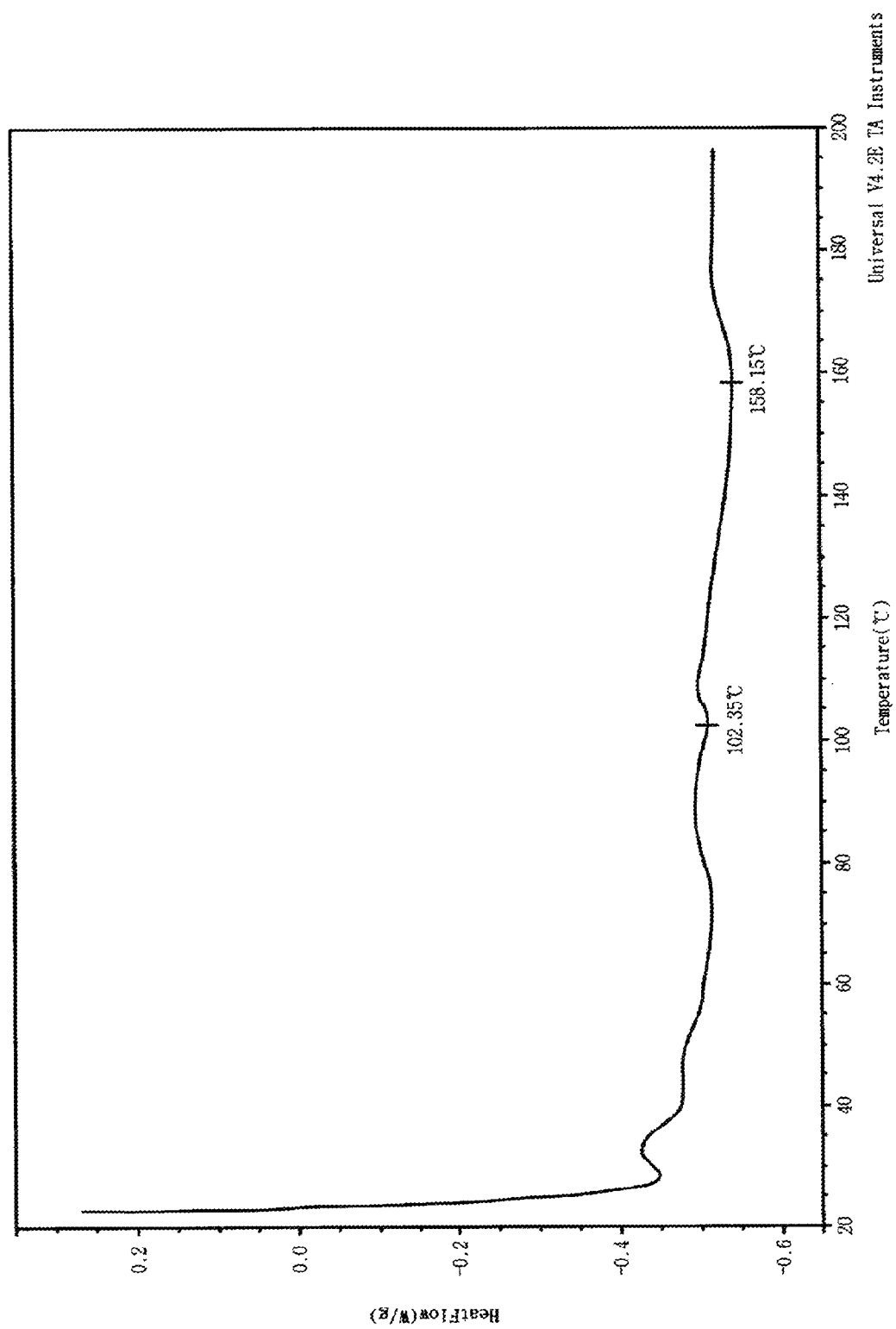
FIG. 7 is a graph showing a differential thermal analysis of a second adhesive film shown in FIG. 2.
Figure 8:
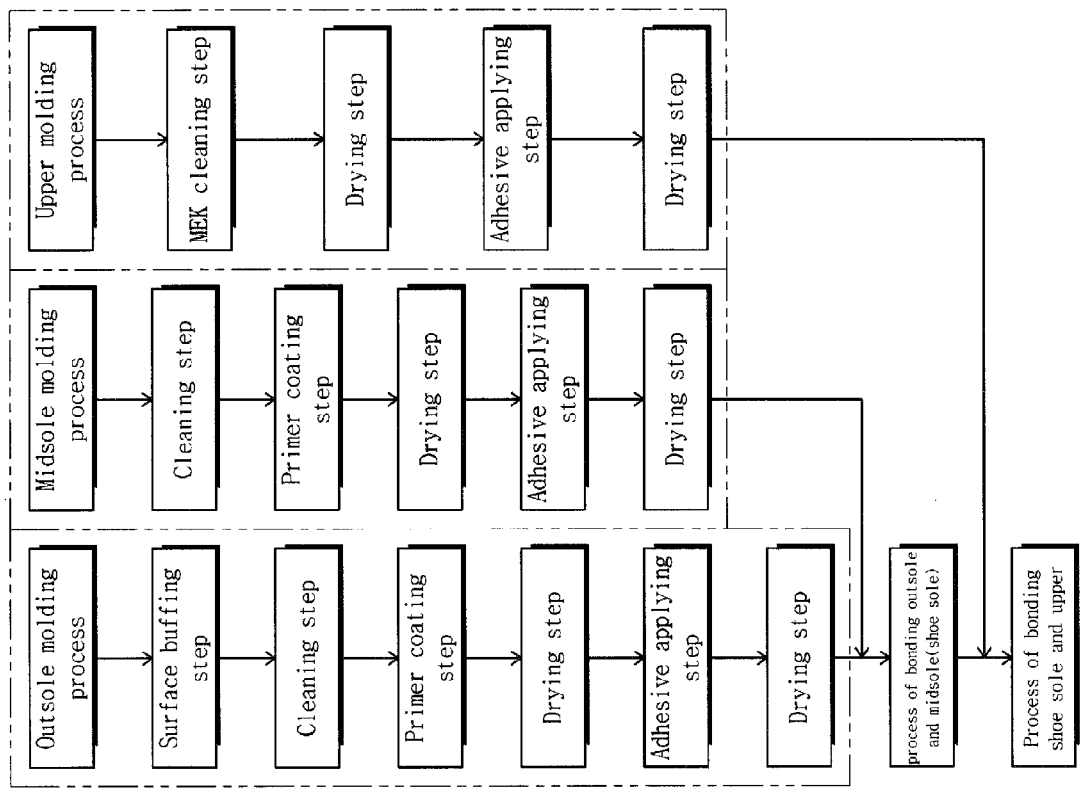
FIG. 8 is a view showing a method of manufacturing footwear including an outsole, a midsole and an upper according to a prior art.

Moreover, FIG. 7 shows a differential thermal analysis of the second adhesive film 600 having the properties shown in Table 4. The graph of FIG. 7 shows melt temperatures and heat flows of the second adhesive film 600, and for this, a DSC (Differential Scanning calorimetry) is used.

As described above, the adhesive films of the present invention are divided into the second adhesive film 600 for bonding the midsole made of EVA foam and the upper with each other and the first adhesive films 200 and 400 for bonding the outsole and the midsole made of EVA foam, and through the adhesive films, as shown in FIG. 4, the outsole 300 and the EVA foam midsole 500*a* are simultaneously molded in the phylon mold 20, and finally, the shoe sole 700 having the outsole 300 and the midsole 500 simultaneously bonded and molded in one mold (phylon mold) as shown in FIG. 5 is manufactured. Finally, the upper is simply bonded to the midsole 500 by the second adhesive film 600 adhered on the midsole 500, so that the footwear according to the present invention is completely manufactured.

What is claimed is:

1. An adhesive film composite comprising:
    a polyester-type thermoplastic polyurethane (TPU) material;
    2 to 50 percent by weight of a polyethylene-based coupling agent comprising 6 to 20 percent of maleic anhydride;
    0.2 parts by weight of montan wax; and
    2 parts by weight of fatty acid esters with pentaerythritol, the fatty acid having five to nine carbons,
    where all parts by weight are relative to 100 total parts by weight of polyester-type TPU material and polyethylene-based coupling agent.

2. The adhesive film composite of claim 1, comprising 50 to 98 percent by weight of polyester-type TPU.

3. The adhesive film composite of claim 1, wherein the polyethylene-based coupling agent is a EVA-based compatibilizer.

4. The adhesive film composite of claim 1, wherein the composite comprises 77.5 percent by weight of the polyester-type TPU material and 22.5 percent of the polyethylene-based coupling agent, in which the polyethylene-based coupling agent is EVA-based compatibilizer containing 6 percent of maleic anhydride.

5. A shoe sole comprising:
   a first sole formed of rubber;
   a second sole formed of an ethylene vinyl acetate (EVA) foam;
   a first adhesive film interposed between the first sole and a first surface of the second sole; and
   a second adhesive film disposed on a second surface of the second sole,
   wherein the second adhesive film comprises:
      a polyester-type thermoplastic polyurethane (TPU) material;
      2 to 50 percent by weight of a polyethylene-based coupling agent containing maleic anhydride;
      0.2 parts by weight of montan wax; and
      2 parts by weight of fatty acid esters with pentaerythritol, the fatty acid having five to nine carbons,
      where all parts by weight are relative to 100 total parts by weight of polyester-type TPU material and polyethylene-based coupling agent.

6. The shoe sole of claim 5, wherein the second adhesive film comprises 50 to 98 percent by weight of polyester-type TPU.

7. The shoe sole of claim 5, wherein the first adhesive film comprises:
   a thermoplastic elastomer;
   polyethylene-based coupling agent;
   a montan wax; and
   fatty acid esters with pentaerythritol.

8. The shoe sole of claim 7, wherein the thermoplastic elastomer of the first adhesive film comprises 50 to 98 percent by weight of syndiotactic 1,2-polybutadiene.

* * * * *